(12) United States Patent
Arul et al.

(10) Patent No.: US 10,723,253 B2
(45) Date of Patent: Jul. 28, 2020

(54) FRONT TOWER FOR MACHINE

(71) Applicant: Caterpillar Inc., Deerfield, IL (US)

(72) Inventors: Samuel Judson William Arul, Marana, AZ (US); Sharath Kesani, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 176 days.

(21) Appl. No.: 16/052,792

(22) Filed: Aug. 2, 2018

(65) Prior Publication Data
US 2020/0039413 A1 Feb. 6, 2020

(51) Int. Cl.
*B60P 1/28* (2006.01)
*B60P 1/04* (2006.01)

(52) U.S. Cl.
CPC .......... *B60P 1/286* (2013.01); *B60P 1/04* (2013.01); *B60P 1/28* (2013.01); *B60P 1/283* (2013.01)

(58) Field of Classification Search
CPC .. B60P 1/286; B60P 1/28; B60P 1/283; B60P 1/04
USPC ............... 298/17 R, 22 R, 22 P; 296/183.2
See application file for complete search history.

(56) References Cited

U.S. PATENT DOCUMENTS

| | | | |
|---|---|---|---|
| 6,481,785 B1 | 11/2002 | Coleman et al. | |
| 6,935,678 B1 | 8/2005 | Laban et al. | |
| 8,820,844 B2 * | 9/2014 | Moon | B60P 1/286 298/22 R |
| 9,266,457 B2 | 2/2016 | Kitaguchi et al. | |
| 9,649,966 B2 | 5/2017 | Wang et al. | |
| 9,751,445 B1 | 9/2017 | Arul et al. | |
| 2013/0187435 A1 * | 7/2013 | Uranaka | B60K 13/04 298/17 R |
| 2014/0015279 A1 | 1/2014 | De Paula E Silva et al. | |
| 2015/0159729 A1 | 6/2015 | Goldwin | |
| 2015/0165957 A1 | 6/2015 | Sarangapani et al. | |

FOREIGN PATENT DOCUMENTS

| | | |
|---|---|---|
| AU | 2012213921 | 9/2013 |
| JP | 2007176251 | 7/2007 |
| WO | 2014019010 | 2/2014 |

* cited by examiner

*Primary Examiner* — Stephen T Gordon

(57) ABSTRACT

A front tower for a truck body of a machine includes a beam member. The front tower includes a landing plate. The front tower also includes a first plate member connected between the beam member and the landing plate, and a second plate member disposed adjacent to the first plate member. The second plate member is connected between the beam member and the landing plate. The front tower includes a first side plate and a second side plate spaced apart from the first side plate. The front tower further includes a cover plate assembly extending between the first side plate and the second side plate. The cover plate assembly, the first side plate, and the second side plate enclose the first plate member and the second plate member.

20 Claims, 8 Drawing Sheets

FRONT TOWER FOR MACHINE

TECHNICAL FIELD

The present disclosure relates to a truck body of a machine. More particularly, the present disclosure relates to a front tower associated with the truck body of the machine.

BACKGROUND

Machines, such as mining trucks, are used for transportation of material from one place to another at a worksite. Such machines are constructed to carry a weight of a truck body of the machine and a weight of material that is present in the truck body. Repeated impacts on the truck body from loading and dumping through operational cycles and the truck body's oscillations due to adverse haul roads generate high forces that may result in development of stress concentrations on the truck body. Stress concentrations can reduce a fatigue life of the truck body.

Typically, such machines include front towers coupled to a front wall of the truck body. The front towers withstand the high forces induced by adverse haul roads and repeated impacts from loading and dumping. The front towers provide stability to the machine and are critical for transferring a portion of load from the material in the truck body to a frame of the machine. This load transfer occurs through a landing plate attached at a lower end of the front tower. The landing plate is typically attached to the front wall of the truck body. An area around a joint between the landing plate and the front wall is prone to fatigue cracking due to large displacement on the front wall and the loads being transferred through the front tower between the truck body and the frame. To overcome this reduced fatigue life, doublers and gussets are typically used, but they do not fully alleviate the problem in some designs.

U.S. Pat. No. 9,751,445 describes a front tower on a truck body for use with a mining vehicle. The truck body includes a truck bed including a canopy and a front wall. The front wall includes at least one front tower. The front tower includes two longitudinal plates spanning the front wall, at least one gusset plate transverse and connected to the longitudinal plates, and a landing plate transverse and connected to the longitudinal plates. The landing plates are configured to transfer load stress from the bed to a frame of a mining vehicle.

SUMMARY OF THE DISCLOSURE

In one aspect of the present disclosure, a front tower for a truck body of a machine is provided. The truck body includes a beam member. The front tower includes a landing plate subjected to load stress from the truck body. The front tower also includes a first plate member connected between the beam member and the landing plate. The front tower further includes a second plate member disposed adjacent to the first plate member. The second plate member is connected between the beam member and the landing plate. The first and second plate members are adapted to transfer the load stress received by the landing plate to the beam member. The front tower includes a first side plate disposed around the beam member. A lower end of the first side plate is connected to the landing plate. The front tower also includes a second side plate spaced apart from the first side plate. The second side plate is disposed around the beam member and a lower end of the second side plate is connected to the landing plate. The front tower further includes a cover plate assembly extending between the first side plate and the second side plate. The cover plate assembly, the first side plate, and the second side plate enclose the first plate member and the second plate member.

In another aspect of the present disclosure, a truck body for a machine having a frame is provided. The truck body includes a front wall. The truck body also includes a canopy extending from the front wall. The truck body further includes a beam member extending transversely across the front wall. The truck body includes a front tower adapted to transfer load stress from the truck body to the frame. The front tower includes a landing plate subjected to load stress from the truck body. The front tower also includes a first plate member connected between the beam member and the landing plate. The front tower further includes a second plate member disposed adjacent to the first plate member. The second plate member is connected between the beam member and the landing plate. The first and second plate members are adapted to transfer the load stress received by the landing plate to the beam member. The front tower includes a first side plate disposed around the beam member. A lower end of the first side plate is connected to the landing plate. The front tower also includes a second side plate spaced apart from the first side plate. The second side plate is disposed around the beam member. A lower end of the second side plate is connected to the landing plate. The front tower further includes a cover plate assembly extending between the first side plate and the second side plate. The cover plate assembly, the first side plate, and the second side plate enclose the first plate member and the second plate member.

In yet another aspect of the present disclosure, a machine is provided. The machine includes a frame and a truck body pivotally connected to the frame. The truck body includes a beam member and a front tower adapted to transfer load stress from the truck body to the frame. The front tower includes a landing plate subjected to load stress from the truck body. The front tower also includes a first plate member connected between the beam member and the landing plate. The front tower further includes a second plate member disposed adjacent to the first plate member. The second plate member is connected between the beam member and the landing plate. The first and second plate members are adapted to transfer the load stress received by the landing plate to the beam member. The front tower includes a first side plate disposed around the beam member. A lower end of the first side plate is connected to the landing plate. The front tower also includes a second side plate spaced apart from the first side plate. The second side plate is disposed around the beam member. A lower end of the second side plate is connected to the landing plate. The front tower further includes a cover plate assembly extending between the first side plate and the second side plate. The cover plate assembly, the first side plate, and the second side plate enclose the first plate member and the second plate member.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
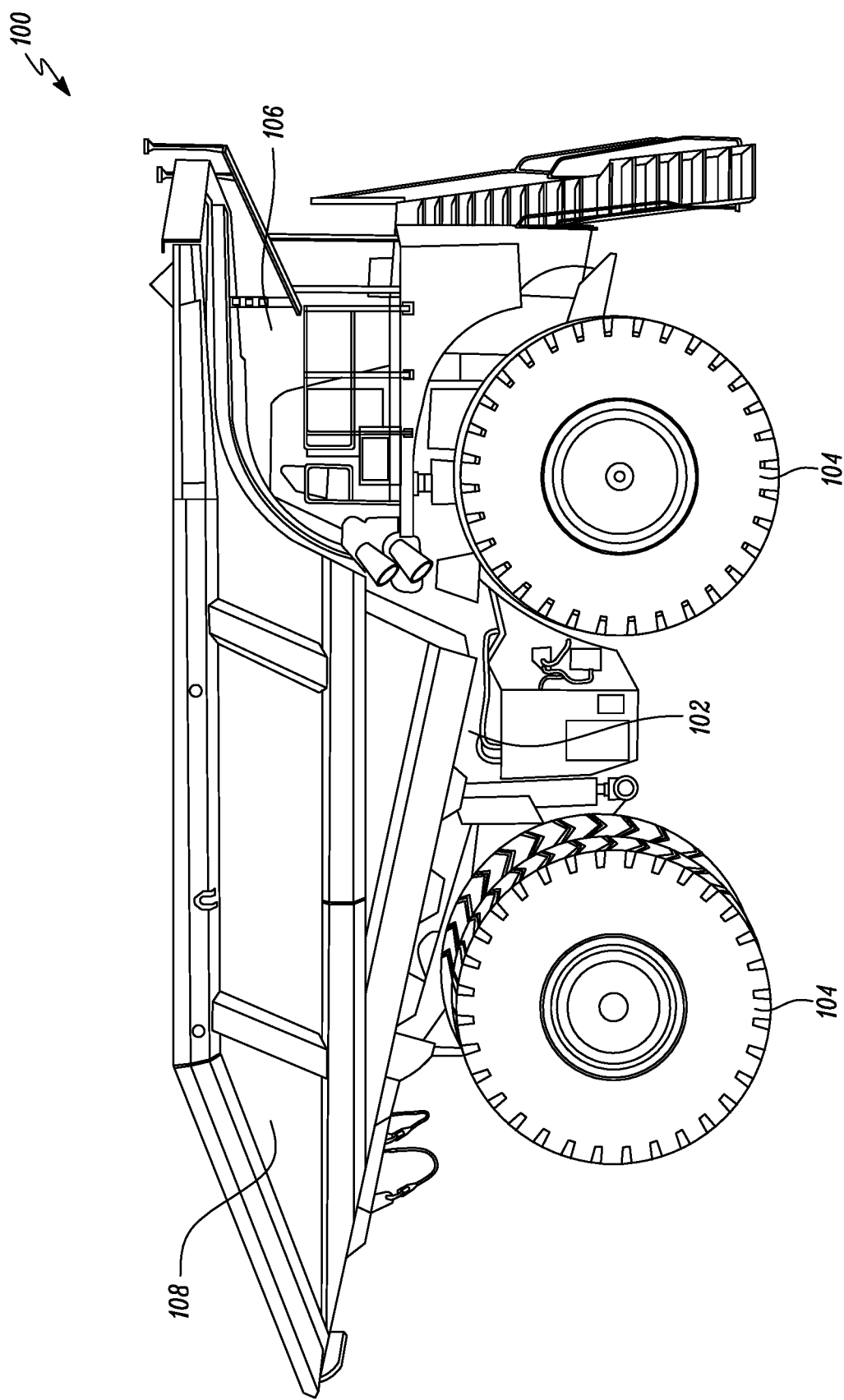
FIG. 1 is a side view of a machine, according to one embodiment of the present disclosure.

FIG. 1 is a side view of an exemplary machine 100. In the illustrated embodiment, the machine 100 is a mining truck. Alternatively, the machine 100 may embody any other type of truck known in the art. Further, the machine 100 can operate at any worksite, such as, a landfill, a quarry, a construction site, and the like. The machine 100 may perform operations associated with an industry such as mining, construction, farming, transportation, or any other industry known in the art.

The machine 100 includes a frame 102. The frame 102 rotatably supports a set of ground engaging members 104 each of which is embodied as a wheel in the illustrated embodiment of FIG. 1. The ground engaging members 104 rotate about their respective axes thereby propelling the machine 100 on a ground surface. Alternatively, it can be contemplated to embody the set of ground engaging members 104 in the form of tracks (not shown) such that the tracks propel the machine 100.

The machine 100 includes an engine (not shown) for providing propulsion power to the machine 100. The engine may be an internal combustion engine, such as a compression ignition engine, without any limitations. A cab 106 is mounted to the frame 102. When the machine 100 is embodied as a manual machine or a semi-autonomous machine, an operator of the machine 100 is seated within the cab 106 to perform one or more machine operations.

Figure 2:
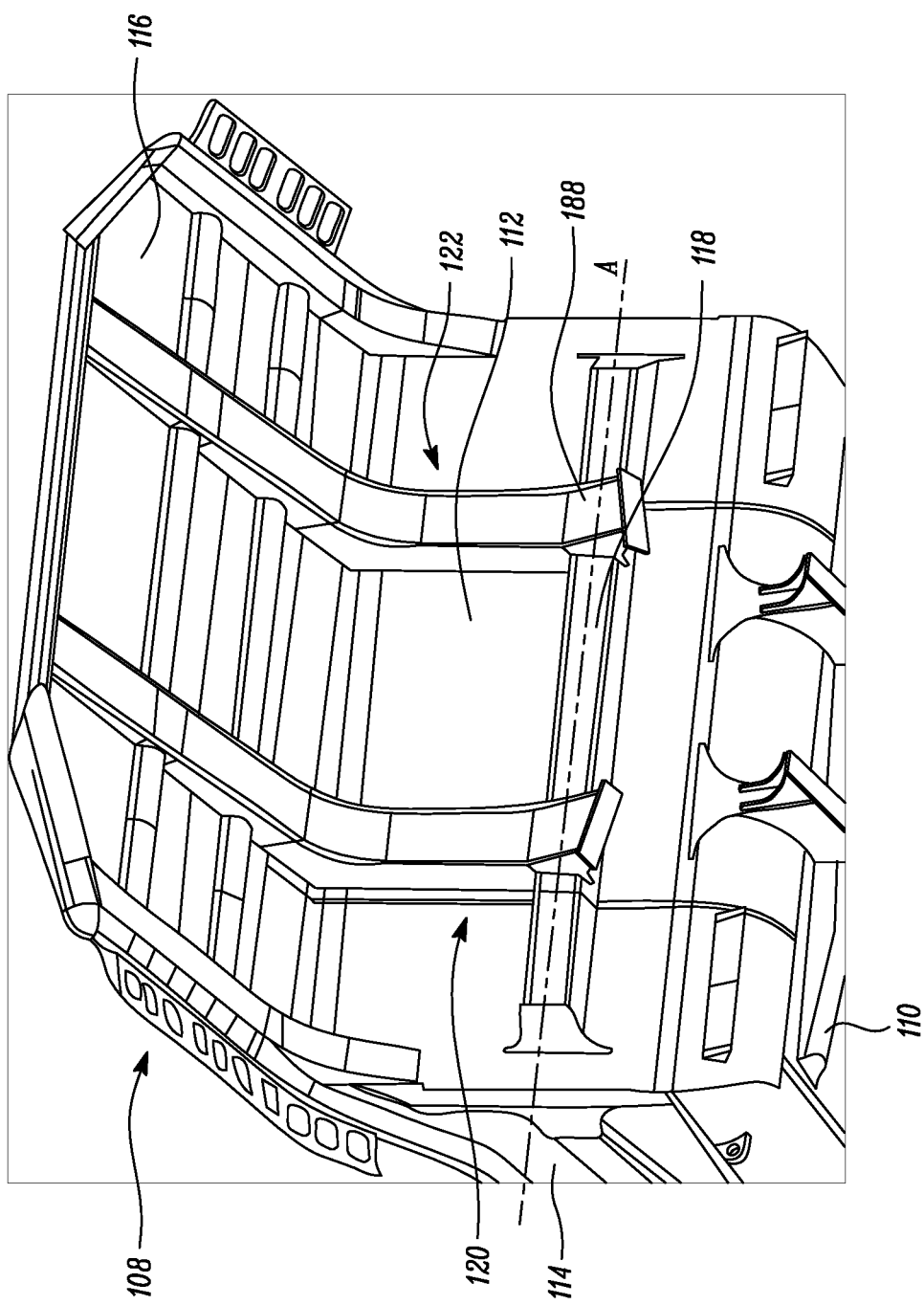
FIG. 2 is a perspective view of a front side of a truck body associated with the machine of FIG. 1.

The machine 100 further includes a truck body 108 for receiving material, such as, soil, sand, asphalt, debris, and the like, and to carry such material during travel of the machine 100 from one location to another location. The truck body 108 will now be explained in reference to FIG. 2. The truck body 108 includes a floor 110, a front wall 112, a first side wall 114, and a second side wall (not shown). The floor 110, the front wall 112, the first side wall 114, and the second side wall are structured and arranged to define a material collection structure (not shown). The material collection structure receives and holds material therein. Further, the truck body 108 includes a canopy 116 extending from the front wall 112 and a beam member 118 extending transversely across the front wall 112. The beam member 118 defines a first axis "A".

The truck body 108 is pivotally coupled with the frame 102, and may be tilted between a lowered position, as shown, and a lifted position, to dump material from the truck body 108 in a conventional manner. More particularly, the truck body 108 can be lifted by a hydraulic system (not shown) of the machine 100 to unload the material from a rearward opening of the truck body 108. Thereafter, the truck body 108 can be lowered back which causes high forces and stress concentrations on the truck body 108. In addition, non-optimal haul roads cause oscillations in the truck body 108, thereby causing stress concentrations on the truck body 108.

The front towers 120, 122 help in improving dynamics of the machine during turns and maintain a fatigue life of the frame of the machine, since the frame is designed to carry a portion of load stress through the front towers 120, 122. The front towers 120, 122 increase the fatigue life of the frame since the front towers 120, 122 reduces transfer of the load stress to the frame through other interfaces between the truck body 108 and the frame. The front towers 120, 122 are associated with the front wall 112 of the truck body 108. The front towers 120, 122 transfer the load stress from the truck body 108 to the frame 102. The front tower 120 is spaced apart from the front tower 122 along the first axis "A". For explanatory purposes, the front tower 122 will now be explained in detail with reference to FIGS. 3 and 4. However, it should be noted that the description for the front tower 122 provided below is equally applicable to the front tower 120, without limiting the scope of the present disclosure.

Figure 3:
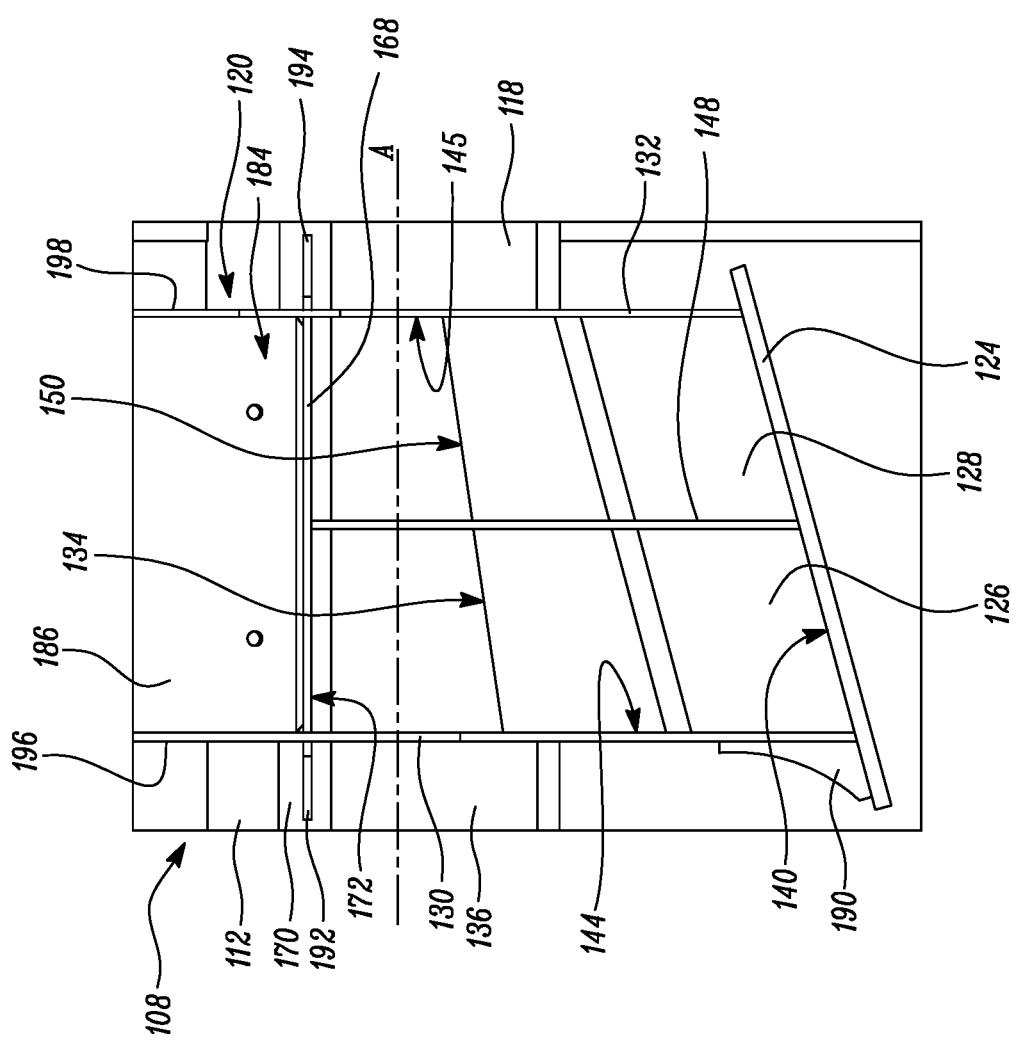
FIG. 3 is a front view of a front tower associated with the truck body of FIG. 2, according to one embodiment of the present disclosure.

As shown in FIG. 3, the front tower 122 includes a landing plate 124. The landing plate 124 is spaced apart from the front wall 112. The landing plate 124 extends angularly with respect to the first axis "A". The landing plate 124 transfers the load stress from the truck body 108 to the frame 102 (see FIG. 1). For example, when the truck body 108 dumps the material and comes back to the lowered position, the landing plate 124 contacts the frame 102 of the mining vehicle 100. When the truck body 108 receives the material, the landing plate 124 contacts the frame 102. Further, as the truck body 108 receives the material, the landing plate 124 is subjected to the load stress by the truck body 108. The contact between the landing plate 124 and the frame 102 allows the transfer of the load stress from the truck body 108 to the frame 102. The landing plate 124 is connected to the beam member 118 by a first plate member 126, a second plate member 128, a first side plate 130, and a second side plate 132.

The front tower 122 includes the first plate member 126 and the second plate member 128 that is mounted adjacent to the first plate member 126. The first plate member 126 is in alignment with the second plate member 128. Each of the first and second plate members 126, 128 extends between the beam member 118 and the landing plate 124 to transfer the load stress received by the landing plate 124 to the beam member 118. In the illustrated example, each of the first and second plate members 126, 128 includes plates that are bent at an angle such that each of the first and second plate members 126, 128 includes an angled profile. Alternatively, each of the first and second plate members 126, 128 may be trapezoidal. Further, each of the first and second plate members 126, 128 may include cut-outs to reduce weight of the first and second plate members 126, 128. In one example, each of the cut-outs may be curvilinear. In another example, each of the cut-outs may be a circular arc.

Each of the first and second plate members 126, 128 are connected to the beam member 118 and the landing plate 124. More particularly, the first plate member 126 defines an upper edge 134 that is connected to a front surface 136 of the beam member 118 and a lower edge (not shown) that is connected to an upper surface 140 of the landing plate 124. Additionally, a first side edge 142 (shown in FIG. 4) of the first plate member 126 is connected to an inner surface 144 of a first side plate 130 and a second side edge 146 (shown in FIG. 4) of the first plate member 126 is connected to a portion of a baffle plate 148. In an example, the first plate member 126 is connected to the first side plate 130, the baffle plate 148, the beam member 118, and the landing plate 124 by welding.

Further, the second plate member 128 defines an upper edge 150 that is connected to the front surface 136 of the beam member 118 and a lower edge (not shown) that is connected to the upper surface 140 of the landing plate 124. Additionally, a first side edge 154 (shown in FIG. 4) of the second plate member 128 is connected to an inner surface 145 of the second side plate 132 and a second side edge (not shown) of the second plate member 128 is connected to a portion of the baffle plate 148. In an example, the second plate member 128 is connected to the second side plate 132, the baffle plate 148, the beam member 118, and the landing plate 124 by welding.

The front tower 122 includes the first side plate 130 and the second side plate 132. The first side plate 130 is parallel to the second side plate 132. Each of the first and second side plates 130, 132 may extend substantially perpendicular to the first axis "A". In the accompanying figure, the first side plate 130 is shown transparent to illustrate features of the front tower 122 that are present behind the first side plate 130.

Figure 4:
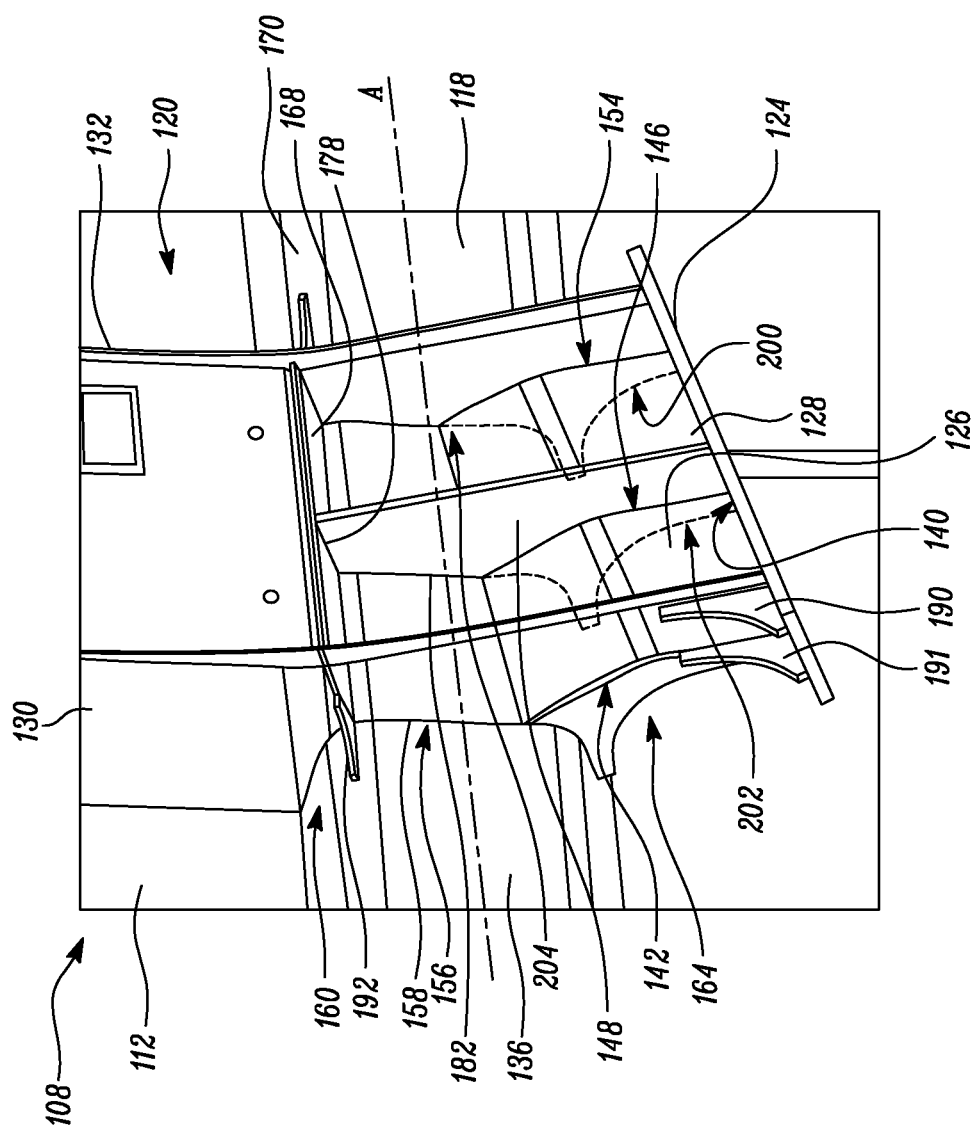
FIG. 4 is a perspective view of the front tower shown in FIG. 3.

The first and second side plates 130, 132 extends between the canopy 116 (shown in FIG. 2) and the landing plate 124. The first and second side plates 130, 132 is disposed around the beam member 118. More particularly, the first and second side plates 130, 132 are provided such that a portion of the respective first and second side plates 130, 132 surrounds the beam member 118. Further, a lower edge (not shown) of the corresponding first and second side plates 130, 132 is connected to the upper surface 140 of the landing plate 124. In an example, the lower edge of the corresponding first and second side plates 130, 132 is welded to the landing plate 124. As shown in FIG. 4, the first side plate 130 defines a first cut-out 156 that receives a portion of the beam member 118. Further, the first cut-out 156 defines a surface 158. The surface 158 is connected to an outer surface 160 of the beam member 118. In an example, the surface 158 is welded to the outer surface 160 of the beam member 118 for connecting the first side plate 130 with the beam member 118. Further, the first side plate 130 defines a second cut-out 164. The second cut-out 164 is arch shaped to avoid stress concentration at the first side plate 130, at a location where the second cut-out 164 ends at the beam member 118.

The second side plate 132 defines a first cut-out 204 that receives a portion of the beam member 118. Further, the first cut-out 204 defines a surface (not shown). The surface defined by the first cut-out 204 is connected to the outer surface 160 of the beam member 118. In an example, the surface defined by the first cut-out 204 is welded to the outer surface 160 of the beam member 118 for connecting the second side plate 132 with the beam member 118. Further, the first side plate 130 defines a second cut-out 200. The second cut-out 200 is arch shaped to avoid stress concentration at the second side plate 132, at a location where the second cut-out 200 ends at the beam member 118.

The front tower 122 includes a transverse plate 168. In an example, the transverse plate 168 may extend substantially parallel to the first axis "A". The transverse plate 168 extends between the first side plate 130 and the second side plate 132. The transverse plate 168 projects outwards from a portion of an upper surface 170 of the beam member 118. The transverse plate 168 is connected to the inner surface 144 of the first side plate 130, the inner surface 145 of the second side plate 132, and the upper surface 170 of the beam member 118. The transverse plate 168 may be connected to the beam member 118, the first side plate 130, and the second side plate 132 by welding, without any limitations.

Further, the front tower 122 includes the baffle plate 148. The baffle plate 148 may be substantially perpendicular to the first axis "A". In an example, the baffle plate 148 is substantially parallel to each of the first and second side plates 130, 132. The baffle plate 148 is centered in a space between the first side plate 130 and the second side plate 132. The first plate member 126 extends between the first side plate 130 and the baffle plate 148. Further, the second plate member 128 extends between the baffle plate 148 and the second side plate 132. An upper edge 178 of the baffle plate 148 is connected to the transverse plate 168 and a lower edge (not shown) of the baffle plate 148 is connected to the upper surface 140 of the landing plate 124. Additionally, a portion 182 of the baffle plate 148 is connected to the front surface 136 of the beam member 118. The baffle plate 148 may be connected to the transverse plate 168, the beam member 118, and the landing plate 124 by welding, without any limitations. The baffle plate 148 defines a second cut-out 202. The second cut-out 202 is arch shaped to avoid stress concentration at the baffle plate 148, at a location where the second cut-out 202 ends at the beam member 118.

It should be noted that the second cut-outs 164, 200, 202 of the respective first side plate 130, the second side plate 132, and the baffle plate 148 separate the landing plate 124 from the front wall 112. More particularly, the second cut-outs 164, 200, 202 eliminate direct connection of the landing plate 140 with the front wall 112. The landing plate 124 may be separated from the front wall 112 by a predefined distance, based on application requirements. The second cut-outs 164, 200, 202 also increase the transfer of the load stress through the first and second plate members 126, 128. Each of the first and second plate members 126, 128 in turn reduces the transfer of the load stress through the first and second side plates 130, 132, the transverse plate 168, and the baffle plate 148, by transferring the load stress from the landing plate 124 to the beam member 118.

Referring now to FIG. 3, the front tower 122 includes a cover plate assembly 184. The cover plate assembly 184 extends between the first side plate 130 and the second side plate 132, such that the cover plate assembly 184, the first side plate 130, and the second side plate 132 together enclose the first plate member 126 and the second plate member 128. The cover plate assembly 184 includes a first cover plate 186 and a second cover plate 188 (shown in FIG. 2). The first cover plate 186 extends between the canopy 116 (see FIG. 2) and an outer edge 172 of the transverse plate 168. The first cover plate 186 is connected to each of the canopy 116, the transverse plate 168, a portion of the inner surface 144 (see FIG. 3) of the first side plate 130, and a portion of the inner surface 145 (see FIG. 3) of the second side plate 132. In an example, the first cover plate 186 may be connected to each of the canopy 116, the transverse plate 168, the first side plate 130, and the second side plate 132 by welding.

Further, the second cover plate 188 extends between the outer edge 172 of the transverse plate 168 and the upper surface 140 of the landing plate 124. The second cover plate 188 is connected to each of the transverse plate 168, a portion of the inner surface 144 of the first side plate 130, a portion of the inner surface 145 of the second side plate 132, and the landing plate 124. In an example, the first cover plate 186 may be connected to each of the transverse plate 168, the first side plate 130, the second side plate 132, and the landing plate 124 by welding.

The front tower 122 also includes a pair of first gusset plates 190, 191 (shown in FIG. 4), a second gusset plate 192, and a third gusset plate 194. The pair of first gusset plates 190, 191 are connected between an outer surface 196 of the first side plate 130 and the upper surface 140 of the landing plate 124. A first surface of the first gusset plate 190 is connected to the first side plate 130 such that the first surface is in alignment with the second cover plate 188. Further, a first surface of the first gusset plate 191 is connected to the first side plate 130 such that the first surface is in alignment with the first plate member 126. In an example, each of the first gusset plates 190, 191 are connected to the first side plate 130 and the landing plate 124 by welding.

The second gusset plate 192 is connected between the outer surface 196 of the first side plate 130 and a portion of the upper surface 170 of the beam member 118. Also, a first surface of the second gusset plate 192 is connected to the first side plate 130 such that the first surface is in alignment with the transverse plate 168 and a second surface of the second gusset plate 192 is connected to the portion of the upper surface 170 of the beam member 118. In an example, the second gusset plate 192 is connected to the first side plate 130 and the beam member 118 by welding.

The third gusset plate 194 is connected between an outer surface 198 of the second side plate 132 and a portion of the upper surface 170 of the beam member 118. Further, a first surface of the third gusset plate 194 is connected to the second side plate 132 such that the first surface is in alignment with the transverse plate 168 and a second surface of the third gusset plate 194 is connected to the portion of the upper surface 170 of the beam member 118. In an example, the third gusset plate 194 is connected to the second side plate 132 and the beam member 118 by welding.

Figure 5:
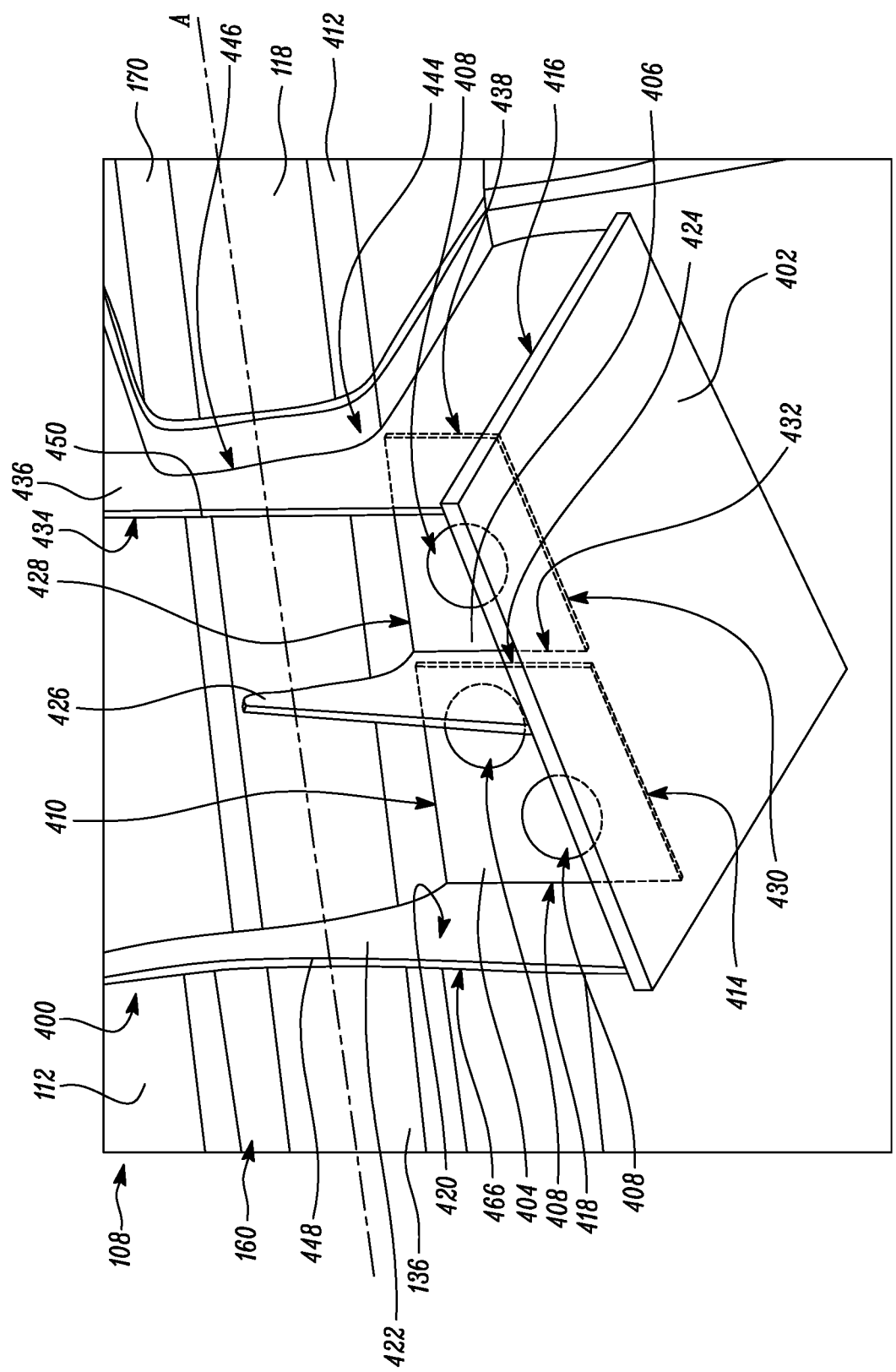
FIG. 5 is a perspective view of a front tower associated with the truck body of FIG. 2, according to another embodiment of the present disclosure.

FIG. 5 illustrates another design of a front tower 400, according to an embodiment of the present disclosure. The front tower 400 is similar in design, construction, and function to the front tower 122 described in FIGS. 3 and 4. The front tower 400 includes a landing plate 402. The landing plate 402 is similar in design, construction, and function to the landing plate 124 described in FIGS. 3 and 4. The landing plate 402 is connected to the beam member 118 by a first plate member 404, a second plate member 406, a first side plate 422, and a second side plate 436.

The front tower 400 includes the first plate member 404 and the second plate member 406 mounted adjacent to the first plate member 404. Each of the first and second plate members 404, 406 extends between the beam member 118 and the landing plate 402. In the illustrated example, each of the first and second plate members 404, 406 are trapezoidal. Further, each of the first and second plate members 404, 406 includes cut-outs 408 to reduce weight of the respective first and second plate members 404, 406. In the illustrated example, each of the cut-outs 408 are curvilinear. In another example, each of the cut-outs 408 may be a circular arc. In another embodiments, each of the first and second plate members 404, 406 may include two rectangular plates that are connected at an angle such that each of the first and second plate members 404, 406 includes an angled profile.

Each of the first and second plate members 404, 406 are connected to the beam member 118 and the landing plate 402. More particularly, the first plate member 404 defines an upper edge 410 that is connected to a portion of a lower surface 412 of the beam member 118. Further, a lower edge 414 of the first plate member 404 is connected to an upper surface 416 of the landing plate 402. Additionally, a first side edge 418 of the first plate member 404 is connected to an inner surface 420 of a first side plate 422 and a second side edge 424 of the first plate member 404 is connected to a portion of a baffle plate 426. In an example, the first plate member 404 is connected to the first side plate 422, the baffle plate 426, the beam member 118, and the landing plate 402 by welding.

Further, the second plate member 406 defines an upper edge 428 that is connected to a portion of the lower surface 412 of the beam member 118. Further, a lower edge 430 of the second plate member 406 is connected to the upper surface 416 of the landing plate 402. Additionally, a first side edge 438 of the second plate member 406 is connected to an inner surface 434 of a second side plate 436 and a second side edge 432 of the second plate member 406 is connected to a portion of the baffle plate 426. In an example, the second plate member 406 is connected to the second side plate 436, the baffle plate 426, the beam member 118, and the landing plate 402 by welding.

The front tower 400 includes the first side plate 422 and the second side plate 436. The first side plate 422 is parallel to the second side plate 436. Each of the first and second side plates 422, 436 may extend substantially perpendicular to the first axis "A". The first side plate 422 extends between the canopy 116 (shown in FIG. 2) and the landing plate 402. The first side plate 422 is disposed around the beam member 118. More particularly, the first side plate 422 is provided such that a portion of the first side plate 422 surrounds the beam member 118. The first side plate 422 defines a first cut-out 440 that receives a portion of the beam member 118. In the illustrated embodiment, the first side plate 422 is connected to the front wall 112 and the outer surface 160 of the beam member 118. Additionally, a lower edge (not shown) of the first side plate 422 is connected to the upper surface 416 of the landing plate 402. In an example, the lower edge of the first side plate 422 is welded to the landing plate 402.

Further, the second side plate 436 extends between the canopy 116 and the landing plate 402. The second side plate 436 is disposed around the beam member 118. More particularly, the second side plate 436 is provided such that a portion of the second side plate 436 surrounds the beam member 118. The second side plate 436 defines a first cut-out 444 that receives a portion of the beam member 118. In the illustrated embodiment, the second side plate 436 is connected to the front wall 112 and the outer surface 160 of the beam member 118. Additionally, a lower edge (not shown) of the second side plate 436 is connected to the upper surface 416 of the landing plate 402. In an example, the lower edge of the second side plate 436 is welded to the landing plate 402. It should be noted that the first and second side plates 422, 436 are designed such that outer edges 448, 450 of the respective first and second side plates 422, 436 are spaced apart from the upper surface 170 of the beam member 118.

Figure 6:
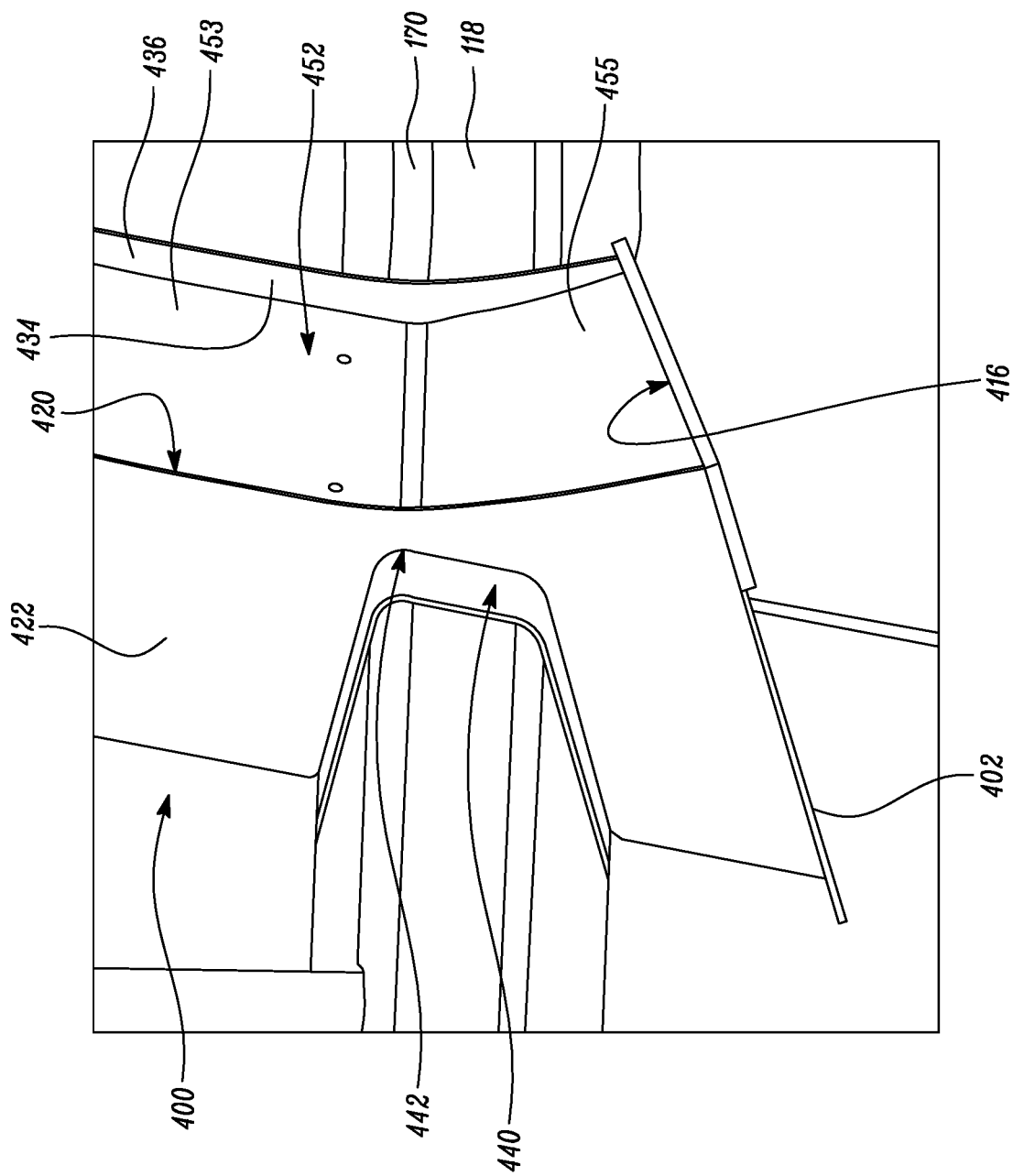
FIG. 6 is a perspective view of the front tower of FIG. 5.

Referring to FIG. 6, the front tower 400 includes a cover plate assembly 452. The cover plate assembly 452 extends between the first side plate 422 and the second side plate 436, such that the cover plate assembly 452, the first side plate 422, and the second side plate 436 together enclose the first plate member 404 (see FIG. 5) and the second plate member 406 (see FIG. 5). The cover plate assembly 452 includes a first cover plate 453 and a second cover plate 455. Further, the first cover plate 453 extends between the canopy 116 (see FIG. 2) and a portion of the upper surface 170 of the beam member 118. The first cover plate 453 is connected to each of the canopy 116, a portion of the inner surface 420 of the first side plate 422, the portion of the upper surface 170 of the beam member 118, and a portion of the inner surface 434 of the second side plate 436. In an example, the first cover plate 453 may be connected to each of the canopy 116, the beam member 118, the first side plate 422, and the second side plate 436 by welding.

The second cover plate 455 extends between a portion of the upper surface 170 of the beam member 118 and the upper surface 416 of the landing plate 402. The second cover plate 455 is connected to each of a portion of the inner surface 420 of the first side plate 422, the portion of the upper surface 170 of the beam member 118, a portion of the inner surface 434 of the second side plate 436, and the landing plate 402. In an example, the first cover plate 453 may be connected to each of the beam member 118, the first side plate 422, the second side plate 436, and the landing plate 402 by welding.

Figure 7:
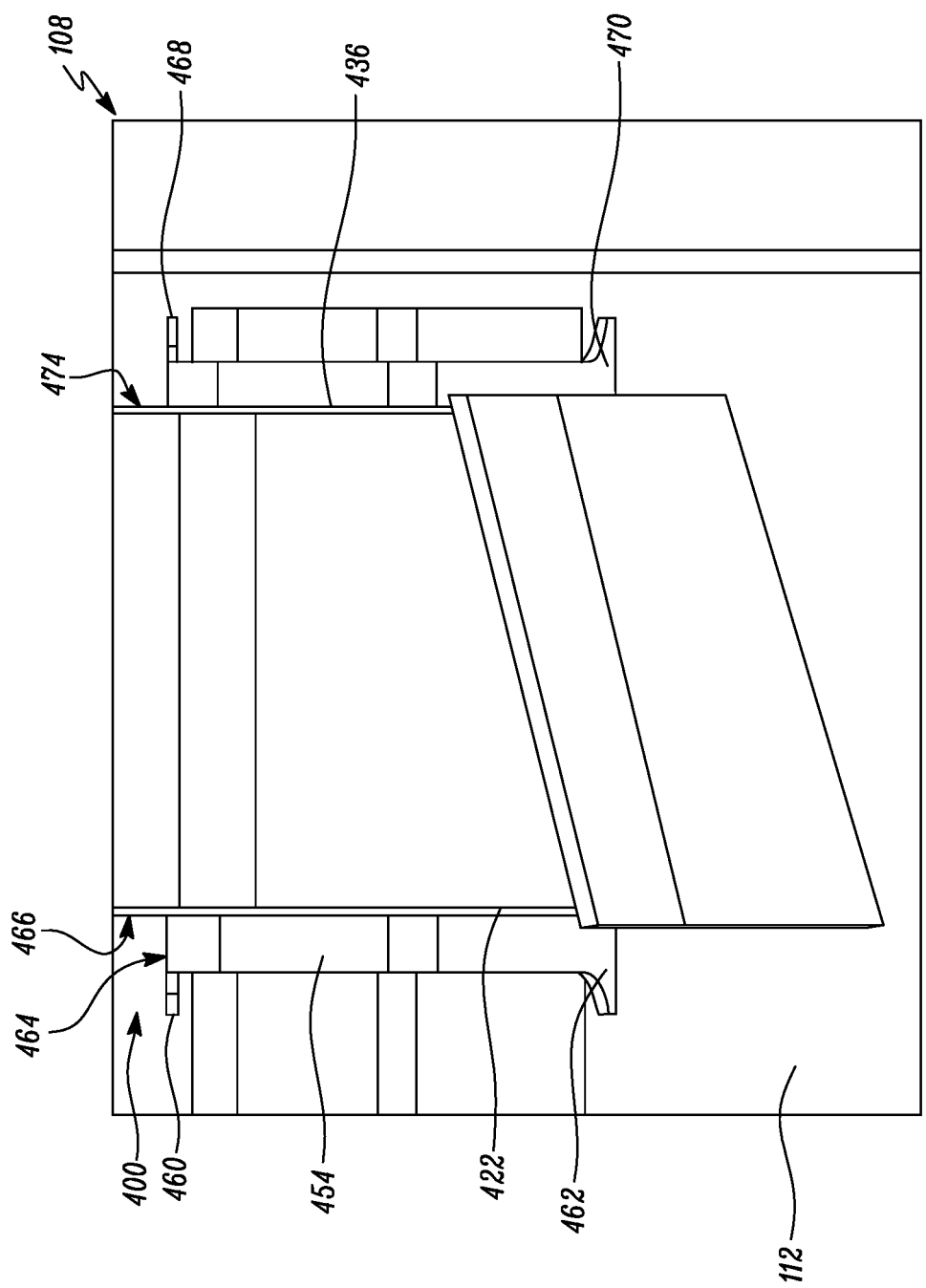
FIG. 7 is a front view of the front tower of FIG. 5.
Figure 8:
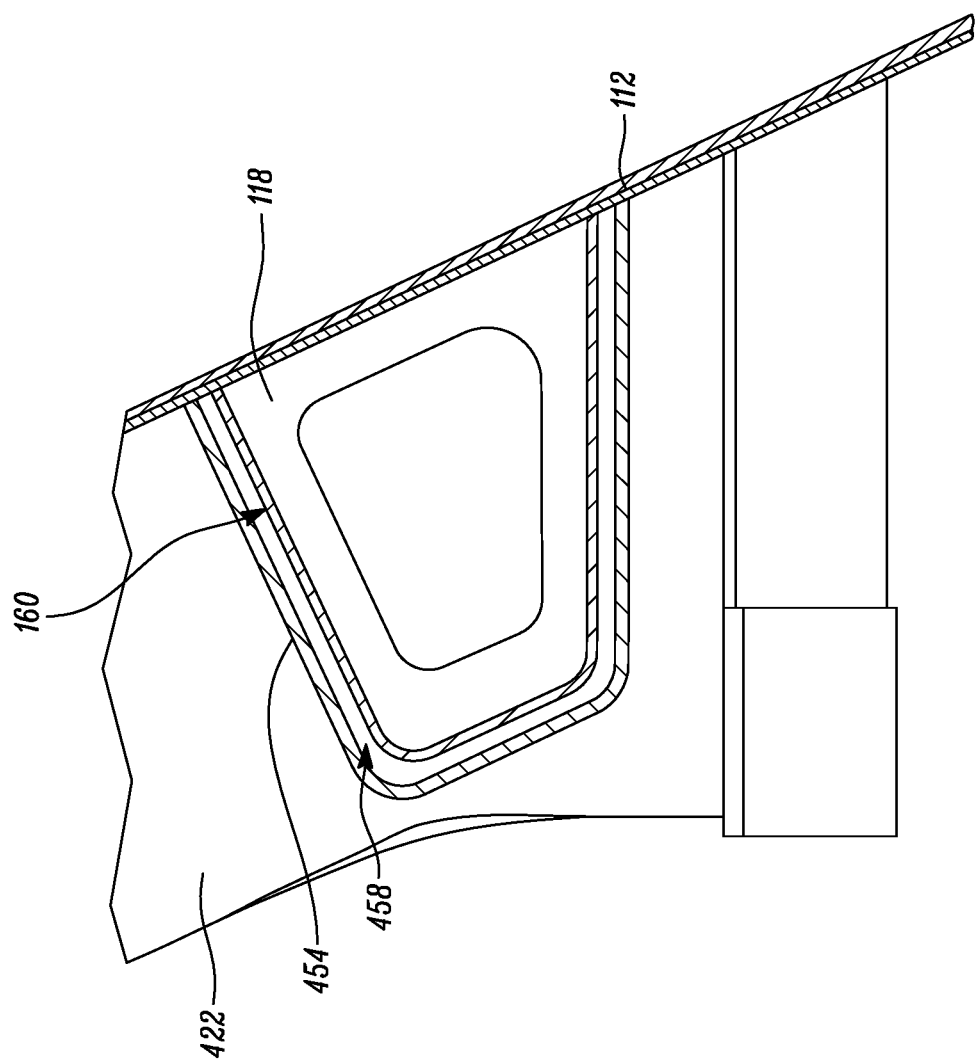
FIG. 8 is a cross-sectional view of the front tower of FIG. 5.

As shown in FIG. 7, the front tower 400 also includes a rib section 454 that protrudes through the first side plate 422 and the second side plate 436. The rib section 454 is spaced apart from the beam member 118 such that a gap 458 (shown in FIG. 8) is formed therebetween. Further, a shape of the rib section 454 conforms with a shape of the outer surface 160 of the beam member 118. The rib section 454 includes a first end portion 460, a second end portion 462 that is spaced apart from the first end portion 460, and an outer surface 464. The first and second end portions 460, 462 are provided adjacent to an end of the first side plate 422. More particularly, the first and second end portions 460, 462 are provided adjacent to an outer surface 466 of the first side plate 422. Each of the first and second end portions 460, 462 are connected to the front wall 112 of the truck body 108. In an example, the first and second end portions 460, 462 are connected to the front wall 112 by welding. Further, the rib section 454 is connected to the first side plate 422. More particularly, the rib section 454 defines the outer surface 464. The outer surface 464 is connected to the outer surface 466 of the first side plate 422. In an example, the outer surface 464 is connected to the outer surface 466 of the first side plate 422 by welding.

Further, the rib section 454 includes a first end portion 468 and a second end portion 470 that is spaced apart from the first end portion 468. The first and second end portions 468, 470 are provided adjacent to an end of the second side plate 436. More particularly, the first and second end portions 468, 470 are provided adjacent to an outer surface 474 of the second side plate 436. Each of the first and second end portions 468, 470 are connected to the front wall 112 of the truck body 108. In an example, the first and second end portions 468, 470 are connected to the front wall 112 by welding. Additionally, the rib section 454 is connected to the second side plate 436. More particularly, the outer surface 464 of the rib section 454 is connected to the outer surface 474 of the second side plate 436. In an example, the outer surface 464 is connected to the outer surface 474 of the second side plate 436 by welding.

In an example, the front towers 120, 122, 400, described above, can be made from metal, such as structural steel, or any other structurally sufficient material, without limiting the scope of the present disclosure.

INDUSTRIAL APPLICABILITY

The present disclosure relates to the front towers 120, 122, 400 associated with the truck body 108 of the machine 100. The front towers 120, 122, 400 provide a strong structure that reduces damage due to fatigue cracking of the truck body 108. More particularly, the front towers 120, 122, 400 disclosed herein provides a simple and cost-effective solution that ensures significant fatigue life improvement of the truck body 108, simplification of front tower design, and provides some weight reduction of the front towers 120, 122, 400 compared to traditional front tower designs.

The landing plate 124, 402 of the front tower 122, 400 is connected to the beam member 118, thereby eliminating fatigue cracking of the landing plate 124, 402 that generally occurs due to a direct connection of the landing plate 124, 402 with the front wall 112. More particularly, the arch shaped second cut-outs 164, 200, 202 eliminate direct connection of the landing plate 124 and the front wall 112. Further, the first and second plate members 126, 128 transfer the load stress from the landing plate 124 to the beam member 118, instead of transferring the load stress to the front wall 112. The front tower 122, 400 includes the first and second plate members 126, 128, 404, 406 that act as support plates to avoid buckling of the landing plate 124, 402 due to load transfer from the truck body 108 to the frame 102.

Further, the first and second side plates 130, 132 are designed such that outer edges of the respective first and second side plates 130, 132 maintain sufficient distance from a joint between the first cover plate 186 and the transverse plate 168. Additionally, the first and second side plates 130, 132 are designed such that the outer edges of the respective first and second side plates 130, 132 maintain sufficient distance from a joint between the transverse plate 168 and the second cover plate 188. Such a design of the first and second side plates 130, 132 accommodates any possible flexing near the joints when the truck body 108 is subjected to events such as twisting on haul roads. More particularly, radiuses defined at the outer edges of the respective first and second side plates 130, 132 are increased to accommodate any possible flexing near the joints when the truck body 108 is subjected to twisting events.

Further, the first and second side plates 422, 436 are designed such that the outer edges 448, 450 of the first and second side plates 130, 132 maintain sufficient distance from a joint between the first cover plate 186 and the beam member 188. Additionally, the first and second side plates 422, 436 are designed such that the outer edges 448, 450 of the first and second side plates 130, 132 maintain sufficient distance from a joint between the beam member 118 and the second cover plate 188. Such a design of the first and second side plates 422, 436 accommodates any possible flexing near the joints when the truck body 108 is subjected to events such as twisting on haul roads. More particularly, radiuses defined at the outer edges 448, 450 of the respective first and second side plates 422, 436 are increased to accommodate any possible flexing near the joints when the truck body 108 is subjected to twisting events.

Additionally, a two-piece design of the cover plate assembly 184, 452 minimizes stress concentration in the front tower 122, 400. In an embodiment, the first and second cover plates 453, 455 are connected to the upper surface 170 of the beam member 118 to promote stiffness at a weld joint between the first cover plate 453 and the beam member 118 and a weld joint between the second cover plate 455 and the beam member 118. Further, the gap 458 between the rib section 454 and the beam member 118 allows structural flexing of the beam member 118 from severe ground induced events that involves body twisting.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A front tower for a truck body of a machine, the truck body having a beam member, the front tower comprising:
 a landing plate subjected to load stress from the truck body;
 a first plate member connected between the beam member and the landing plate;
 a second plate member disposed adjacent to the first plate member, wherein the second plate member is connected between the beam member and the landing plate, the first and second plate members being adapted to transfer the load stress received by the landing plate to the beam member;
 a first side plate disposed around the beam member, wherein a lower end of the first side plate is connected to the landing plate;
 a second side plate spaced apart from the first side plate, the second side plate disposed around the beam member, wherein a lower end of the second side plate is connected to the landing plate; and
 a cover plate assembly extending between the first side plate and the second side plate,
 wherein the cover plate assembly, the first side plate, and the second side plate enclose the first plate member and the second plate member.

2. The front tower of claim 1, wherein the first side plate is connected to an outer surface of the beam member and the second side plate is connected to the outer surface of the beam member.

3. The front tower of claim 1, wherein each of the first side plate, the second side plate, and a baffle plate of the front tower includes a cut-out, each of the cut-outs being adapted to separate the landing plate and a front wall of the truck body.

4. The front tower of claim 3, wherein each of the cut-outs is arch shaped.

5. The front tower of claim 1, wherein each of the first plate member and the second plate member includes an angled profile.

6. The front tower of claim 1 further comprising:
 a transverse plate extending between the first side plate and the second side plate;
 a baffle plate extending between the transverse plate and the landing plate;
 at least one first gusset plate connected between the first side plate and the landing plate;
 a second gusset plate connected between the first side plate and the beam member; and
 a third gusset plate connected between the second side plate and the beam member.

7. The front tower of claim 6, wherein the cover plate assembly includes:
 a first cover plate extending between a canopy of the truck body and an outer edge of the transverse plate; and
 a second cover plate extending between the outer edge of the transverse plate and an outer edge of the landing plate.

8. The front tower of claim 1 further comprising a rib section protruding through the first side plate and the second side plate of the front tower, the rib section being spaced apart from the beam member such that a gap exists therebetween, wherein the rib section on respective ends of the first side plate and the second side plate includes:
 a first end portion connected to a front wall of the truck body;
 a second end portion spaced apart from the first end portion and connected to the front wall of the truck body; and
 an outer surface connected to an outer surface of the first side plate and the second side plate, respectively.

9. A truck body for a machine having a frame, the truck body comprising:
 a front wall;
 a canopy extending from the front wall;
 a beam member extending transversely across the front wall; and
 a front tower adapted to transfer load stress from the truck body to the frame, the front tower comprising:
  a landing plate subjected to the load stress from the truck body;
  a first plate member connected between the beam member and the landing plate;
  a second plate member disposed adjacent to the first plate member, wherein the second plate member is connected between the beam member and the landing plate, the first and second plate members being adapted to transfer the load stress received by the landing plate to the beam member;
  a first side plate disposed around the beam member, wherein a lower end of the first side plate is connected to the landing plate;
  a second side plate spaced apart from the first side plate, the second side plate disposed around the beam member, wherein a lower end of the second side plate is connected to the landing plate; and
  a cover plate assembly extending between the first side plate and the second side plate,
  wherein the cover plate assembly, the first side plate, and the second side plate enclose the first plate member and the second plate member.

10. The truck body of claim 9, wherein the first side plate is connected to an outer surface of the beam member and the second side plate is connected to the outer surface of the beam member.

11. The truck body of claim 9, wherein each of the first side plate, the second side plate, and a baffle plate of the front tower includes a cut-out, each of the cut-outs being adapted to separate the landing plate and a front wall of the truck body.

12. The truck body of claim 9 further comprising:
 a transverse plate extending between the first side plate and the second side plate;
 a baffle plate extending between the transverse plate and the landing plate;
 at least one first gusset plate connected between the first side plate and the landing plate;
 a second gusset plate connected between the first side plate and the beam member; and
 a third gusset plate connected between the second side plate and the beam member.

13. The truck body of claim 12, wherein the cover plate assembly includes:
 a first cover plate extending between the canopy and an outer edge of the transverse plate; and
 a second cover plate extending between the outer edge of the transverse plate and an outer edge of the landing plate.

14. The truck body of claim 9 further comprising a rib section protruding through the first side plate and the second side plate of the front tower, the rib section being spaced apart from the beam member such that a gap exists therebetween, wherein the rib section on respective ends of the first side plate and the second side plate includes:
- a first end portion connected to the front wall of the truck body;
- a second end portion spaced apart from the first end portion and connected to the front wall of the truck body; and
- an outer surface connected to an outer surface of the first side plate and the second side plate, respectively.

15. A machine comprising:
   a frame; and
   a truck body pivotally connected to the frame, wherein the truck body includes:
      a beam member; and
         a front tower adapted to transfer load stress from the truck body to the frame, the front tower comprising:
            a landing plate subjected to the load stress from the truck body;
            a first plate member connected between the beam member and the landing plate;
            a second plate member disposed adjacent to the first plate member, wherein the second plate member is connected between the beam member and the landing plate,
            the first and second plate members being adapted to transfer the load stress received by the landing plate to the beam member;
            a first side plate disposed around the beam member, wherein a lower end of the first side plate is connected to the landing plate;
            a second side plate spaced apart from the first side plate, the second side plate disposed around the beam member, wherein a lower end of the second side plate is connected to the landing plate; and
            a cover plate assembly extending between the first side plate and the second side plate,
            wherein the cover plate assembly, the first side plate, and the second side plate enclose the first plate member and the second plate member.

16. The machine of claim 15, wherein the first side plate is connected to an outer surface of the beam member and the second side plate is connected to the outer surface of the beam member.

17. The machine of claim 15, wherein each of the first side plate, the second side plate, and a baffle plate of the front tower includes a cut-out, each of the cut-outs being adapted to separate the landing plate and a front wall of the truck body.

18. The machine of claim 15 further comprising:
   a transverse plate extending between the first side plate and the second side plate;
   a baffle plate extending between the transverse plate and the landing plate;
   at least one first gusset plate connected between the first side plate and the landing plate;
   a second gusset plate connected between the first side plate and the beam member; and
   a third gusset plate connected between the second side plate and the beam member.

19. The machine of claim 18, wherein the cover plate assembly includes:
   a first cover plate extending between a canopy and an outer edge of the transverse plate; and
   a second cover plate extending between the outer edge of the transverse plate and an outer edge of the landing plate.

20. The machine body of claim 15 further comprising a rib section protruding through the first side plate and the second side plate of the front tower, the rib section being spaced apart from the beam member such that a gap exists therebetween, wherein the rib section on respective ends of the first side plate and the second side plate includes:
   a first end portion connected to a front wall of the truck body;
   a second end portion spaced apart from the first end portion and connected to the front wall of the truck body; and
   an outer surface connected to an outer surface of the first side plate and the second side plate, respectively.

* * * * *